United States Patent [19]

White, Jr.

[11] 3,713,675
[45] Jan. 30, 1973

[54] CONNECTOR FOR TUBULAR MEMBERS

[75] Inventor: William E. White, Jr., Houston, Tex.

[73] Assignee: Hydro Tech Services, Inc., Houston, Tex.

[22] Filed: Jan. 15, 1971

[21] Appl. No.: 106,727

[52] U.S. Cl. ..........................285/3, 285/18, 285/93, 285/96, 285/322, 285/342
[51] Int. Cl. ..............................................F16l 35/00
[58] Field of Search......285/18, 24, 27, 94, 101, 105, 285/165, 248, 302, 308, 322, 323, 373, 414, 421, 348, 343, 341, DIG. 21, 93, 3, 144, 96, 145, 146, 147, 48, 342; 166/0.6, 212; 24/263 DA, 263 DG; 294/86.3

[56] References Cited

UNITED STATES PATENTS

| | | | |
|---|---|---|---|
| 3,393,926 | 7/1968 | Arnold | 285/18 |
| 3,494,638 | 2/1970 | Todd et al. | 285/93 |
| 2,137,853 | 11/1938 | Nixon | 285/145 X |
| 2,931,671 | 4/1960 | Beeley | 285/341 X |
| 3,142,500 | 7/1964 | Wesseler | 285/342 X |
| 1,455,731 | 5/1923 | Kelly | 285/146 X |
| 2,467,822 | 4/1949 | Griffin et al. | 285/3 X |
| 3,097,866 | 7/1963 | Iversen | 285/18 |
| 3,208,788 | 9/1965 | Roork | 294/86.3 X |
| 3,598,429 | 6/1971 | Arnold | 285/18 |

Primary Examiner—Dave W. Arola
Attorney—Paul E. Harris, Lee R. Larkin and Marcus L. Thompson

[57] ABSTRACT

A generally tubular housing arranged for positioning over the end of a tubular member has an inwardly facing annular tapered bowl formed therein. A segmented outwardly facing annular tapered bowl having a gripping surface on the outside surface thereof is arranged for axial and radially outward movement into engagement with the housing in response to an hydraulically generated axial face. Double tapered slips are annularly positioned between and matingly engage the bowls and are driven into engagement with the tubular member in response to axial movement of the segmented bowl. A pair of annular seals arranged for radial deformation into sealing engagement with the tubular members are carried by the housing and have an annular ring positioned therebetween arranged to communicate a pressurized test fluid to the seals after radial deformation thereof. The actuation forces for the segmented bowl and the seals are provided by circumferentially spaced axially aligned cylinders having axially slidable pistons positioned in each end thereof. The central portion of each cylinder has an opening therein to allow introduction of a pressurized hardenable actuation fluid against the pistons and the central cylinder portion has a smaller diameter than that of the pistons to prevent flow of the hardened actuation fluid through the cylinders in response to movement of one piston subsequent to actuation.

8 Claims, 7 Drawing Figures

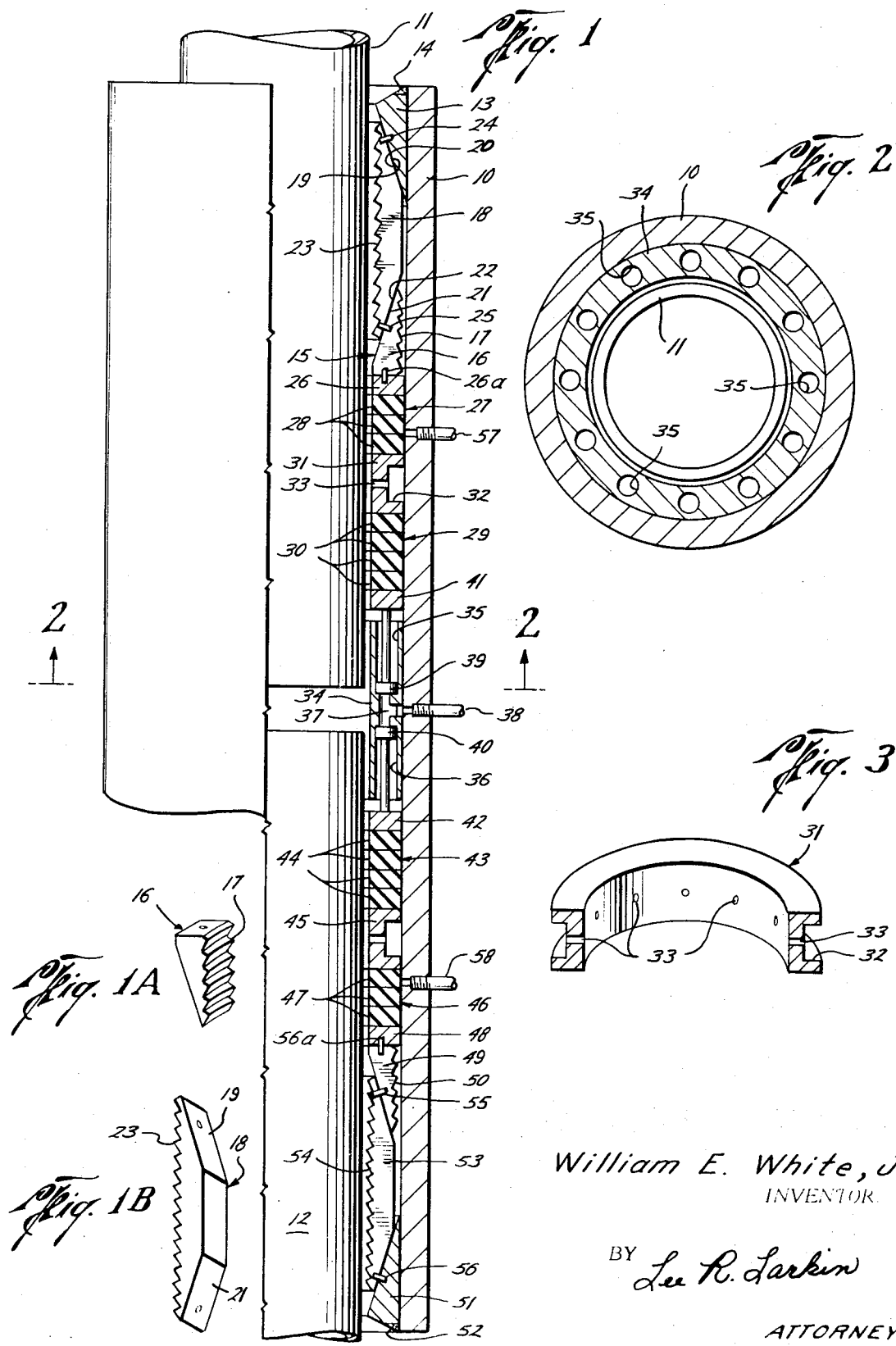

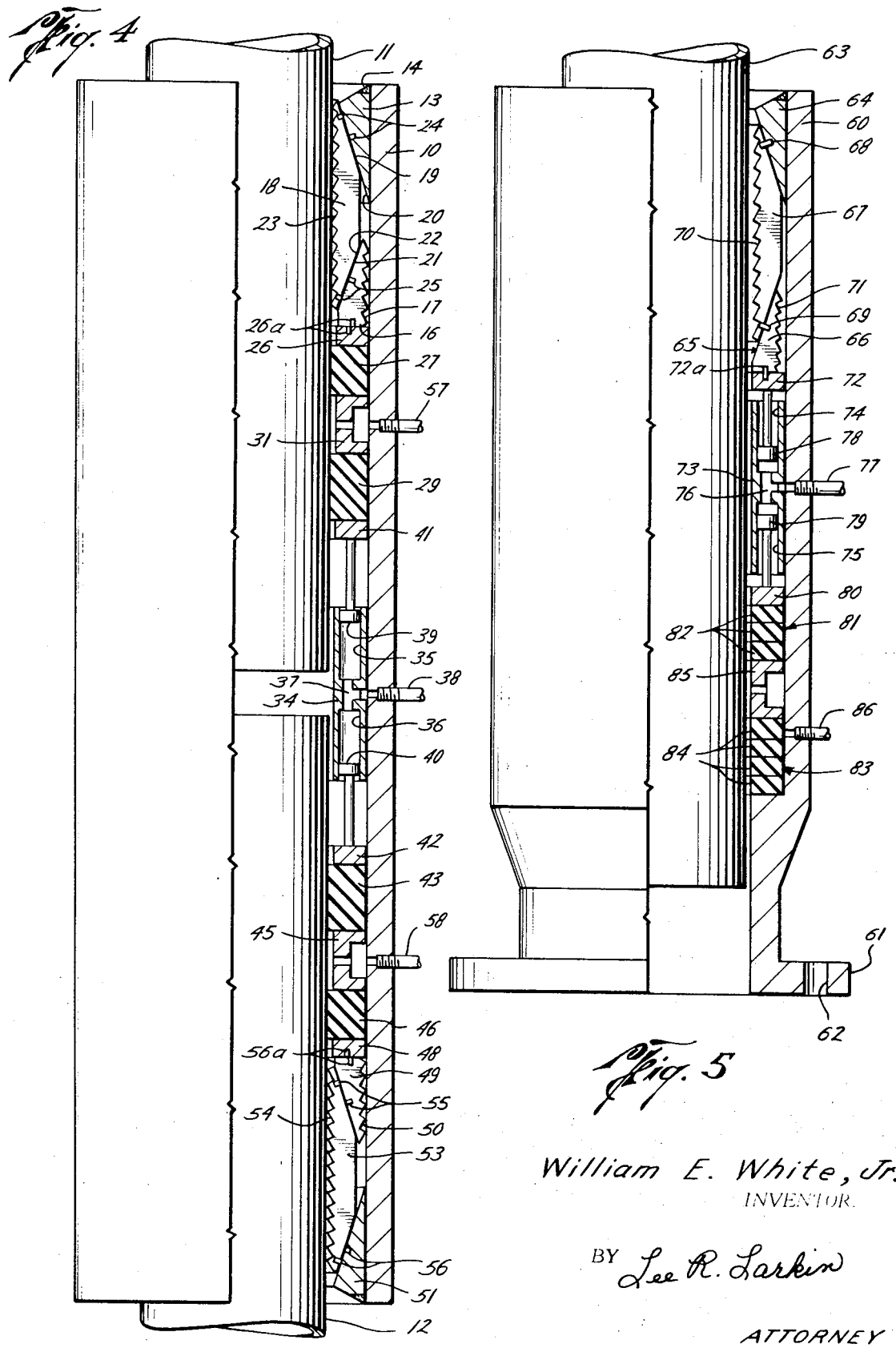

3,713,675

CONNECTOR FOR TUBULAR MEMBERS

BACKGROUND OF THE INVENTION

1. Field of the Invention

Hydraulically actuated oversliding connector for tubular members having annular gripping means and seal means.

2. Description of the Prior Art

In the construction and repair of pipelines, drilling platforms and other structures formed of tubular members, conventional welding techniques are frequently not suitable for making a connection to the tubular member. For example, when joining tubular members underwater or in the presence of explosive materials, welding can be extremely hazardous, time consuming and expensive. Various mechanical connectors have been suggested for use in these environments, however, these connectors generally involve difficult and time consuming mechanical installation techniques.

Hydraulically actuated pipe connectors, such as that illustrated in Arnold U. S. Pat. No. 3,393,926, have been suggested for use in these environments. All of the known prior art connectors of this type are provided with a single set of conventional tapered slips arranged for actuation into engagement between the coupling housing and the pipe positioned therein. Therefore, these connectors will oppose axial forces in only one direction and can become disengaged relatively easily.

In addition, some prior art connectors are provided with one or more annular seals arranged for actuation into fluid tight engagement between the connector housing and the pipe therein. However, no means are provided in these connectors to allow pressure testing of the actuated annular seals without pressurizing the interior of the connected members.

Other prior art hydraulically actuated connectors derive actuating forces for the slips and seals from an annular piston assembly arranged within the housing. In these devices aging of a seal or independent loosening of the slips or seals due to external forces may be transmitted through the piston assembly, resulting in loosening of the other of the slips or seals and causing failure of this connection.

SUMMARY OF THE INVENTION

It is therefore an object of this invention to provide an improved connector for tubular members having gripping elements arranged to oppose axial forces in tension and compression and having annular seal testing means and an improved hydraulic actuation mechanism.

One embodiment of this connector invention includes a housing arranged for positioning over the end of a tubular member with first and second radially deformable annular seals carried by the housing. An annular ring slidably carried by the housing intermediate the seals is arranged to communicate a pressurized seal test fluid to the seals after actuation thereof. The ring may be formed to have an annular groove thereabout with at least one radial opening therethrough to allow passage of the fluid.

Another embodiment of this invention includes a housing arranged for slidable positioning over the end of a tubular member, with an annular, circumferential inwardly facing bowl formed within the housing. An outwardly facing annular bowl carried by the housing is arranged for axial and radially outward movement into gripping engagement with the inside of the housing. An annular slip assembly carried by the housing is positioned intermediate the bowls and is arranged to matingly engage the bowls and to be driven radially inward into gripping engagement with the tubular member in response to axial forces from the bowls. Preferably the slidable bowl is formed of a plurality of longitudinally aligned circumferentially spaced bowl segments having gripping surfaces on the radially outward surfaces thereof.

In a third form this invention includes a housing arranged for positioning over the end of a tubular member, which housing carries gripping means for engaging the tubular member and seal means for forming a pressure tight seal between the housing and the tubular member. The seal means and gripping means are actuatable by an axial force which is derived from discrete pistons which are coaxially disposed within each end of a plurality of longitudinally aligned circumferentially spaced cylinders carried by the housing. The inside diameter of the cylinders intermediate the pistons is less than the outside diameter of the pistons, thereby preventing the movement of one piston from being transmitted by a solid material in the cylinder to the other piston in the same cylinder.

BRIEF DESCRIPTION OF THE DRAWINGS

FIG. 1 is a partial side elevation view, partly in section, of one embodiment of this connector invention.

FIG. 1A is an isometric view of one segment of the outwardly facing slidable bowl assembly illustrated in FIG. 1.

FIG. 1B is an isometric view of one segment of the double tapered slip assembly illustrated in FIG. 1.

FIG. 2 is a sectional view taken along 2 — 2 of FIG. 1.

FIG. 3 is a partial isometric view of the seal pressure testing ring illustrated in FIG. 1.

FIG. 4 is a view similar to FIG. 1 but showing the connector invention actuated into engagement with a pipe positioned therein.

FIG. 5 is a partial side elevation view, partly in section, of a second embodiment of this connector invention.

DESCRIPTION OF THE PREFERRED EMBODIMENT

Referring to the drawings and particularly to FIG. 1, a first embodiment of this connector invention presently preferred by the inventor is illustrated in the form of a pipe coupling and includes a housing 10 arranged for positioning over the end of tubular members or pipes 11 and 12.

The upper end of housing 10, as viewed in FIG. 1, has a circumferential, annular inwardly facing tapered bowl 13 formed therein. Bowl 13 may be formed as a part of housing 10 or may be formed separately and connected thereto as by weld 14. Inwardly axially spaced from bowl 13 is a second annular tapered bowl 15 which faces outwardly toward bowl 13. Bowl 15 is formed of a plurality of longitudinally aligned circumferentially spaced tapered bowl segments 16, one of which is illustrated in cross section in FIG. 1.

One of segments 16 is illustrated in isometric view in FIG. 1A. Segments 16 are provided with wickers or serrations or partial circumferential ridges 17 on the outer surfaces thereof arranged to grip the inside surface of housing 10 upon actuation. Although not illustrated, bowl 15 could be constructed in the form of a tapered ring having one or more longitudinal slots therethrough. Proper functioning of bowl 15 requires only that bowl 15 be suitably arranged for axial and radially outward movement into gripping engagement with housing 10.

Between bowls 13 and 15 are provided a plurality of longitudinally aligned circumferentially spaced slip segments 18 arranged for axially slidable movement within housing 10 and for radially inward movement into gripping engagement with pipe 11. One of segments 18 is illustrated in isometric in FIG. 1B. Each of segments 18 is an elongate member having one portion of the radially outward surface 19 thereof tapered for mating engagement with inwardly facing tapered surface 20 of bowl 13 and having another portion of the radially outward surface 21 thereof tapered for mating engagement with outwardly facing tapered surface 22 of bowl 15. The radially inward surfaces of slips 18 are provided with serrations or wickers 23 arranged to grip and engage the outer surface of pipe 11 upon actuation.

To maintain slips 18 and bowl segments 16 in their circumferentially disposed relation prior to insertion of pipe 11 into housing 10 and actuation thereof, a shear pin 24 is provided between each of slips 18 and bowl 13. A similar shear pin 25 is provided between each of slips 18 and bowl segments 16. These shear pins are of sufficient strength to maintain slips 18 and segments 16 in the illustrated circumferentially disposed position but are easily sheared off by the axial actuation forces applied thereto, as described below.

Adjacent the thicker (or lower, as viewed in FIG. 1) end of bowl 15 is slidably positioned an annular compression ring 26 arranged to distribute axial actuation forces to bowl segments 16. Ring 26 also acts as a back up for the deformable seal means described below. Between ring 26 and each of segments 16 are provided additional shear pins 26a, which aid in retaining segments 16 in their original position.

Annularly slidably positioned below ring 26, as viewed in FIG. 1, is a first seal 27 formed of packer rings 28. Seal 27 is arranged initially to be spaced from pipe 11 and to be deformable radially inward into sealing engagement with pipe 11 in response to an axial actuation force. A second annular seal 29 similarly formed of deformable packer rings 30 is inwardly axially spaced from seal 27. Intermediate seals 27 and 29 is positioned an annular slidable pressure test ring 31.

Ring 31 is illustrated in a partial isometric view in FIG. 3 and is generally tubular in shape with an annular groove 32 thereabout. Radial passages 33 are provided through ring 31 to allow radial fluid flow therethrough, as explained below.

Referring now to the central portion of FIG. 1, housing 10 has secured therein a ring shaped cylinder block 34 having a plurality of oppositely facing coaxial cylinders 35 and 36 bored therein.

A "tee" fluid passageway 37 is bored into block 34 intermediate cylinders 35 and 36 and provides means for injecting a pressurized fluid thereinto. Alternatively, cylinders 35 and 36 and tee 37 may be considered as a single cylinder having a restricted central passageway therethrough and a second passageway communicating therewith. The annular shape of block 34 and the longitudinally aligned, circumferentially disposed relationship of cylinders 35 and 36 may be seen in FIG. 2, which is a sectional view taken through cylinders 35 along 2 — 2 of FIG. 1. Referring again to the central portion of FIG. 1, an actuation fluid inlet line 38 is connected to housing 10 adjacent the radial arm of tee 37 and provides means for transmitting a pressurized actuation fluid thereto.

Slidably coaxially disposed within each of cylinders 35 and 36 are pistons 39 and 40, respectively, arranged for axially opposed outward movement in response to a fluid pressure in tee 37. Pistons 39 direct an axial actuation force upward, as viewed in FIG. 1, against seal 29. An annular slidable compression ring 41 is provided therebetween for the purpose of evenly distributing the forces from pistons 39 to seal 29.

The upper portion of the coupling embodiment of FIG. 1. above described is repeated in mirror image in the lower portion of FIG. 1 and includes, in order, annular compression ring 42 adjacent pistons 40, annular radially deformable seal 43 formed of packer rings 44, pressure test ring 45, annular radially deformable seal 46 formed of packer rings 47, and annular compression ring 48.

A plurality of longitudinally aligned circumferentially disposed outwardly facing bowl segments 49 having wickers 50 on the radially outward surfaces thereof are slidably disposed in housing 10 adjacent ring 48 and are arranged for axial and radially outward movement into gripping engagement with housing 10.

An inwardly facing annular tapered bowl 51 is provided within the lower end of housing 10, as viewed in FIG. 1, and is suitably secured thereto by weld 52. Between bowls 49 and 51 are slidably positioned a plurality of longitudinally aligned circumferentially spaced slips 53 having the radially outward surfaces thereof tapered to matingly fit into bowls 49 and 51. Slips 53 similarly are provided with wickers 54 on the radially inward surfaces thereof. Shear pins 55, 56 and 56a are provide between bowl segments 49 and slips 53, between slips 53 and bowl 51 and between bowl segments 49 and compression ring 48, respectively, and provide means for retaining slips 53 and bowl segments 49 in their circumferentially arranged position prior to actuation.

Housing 10 is also provided with two additional fluid inlet lines. As viewed in FIG. 1, a first test fluid inlet line 57 is connected to housing 10 adjacent seal 27 above test ring 31 and a second test fluid inlet line 58 is connected to housing 10 adjacent seal 46 below test ring 45. The positioning of lines 57 and 58 will be further explained with reference to the operational description below.

In operation this coupling apparatus is initially in the unactuated condition shown in FIG. 1 and pipes 11 and 12 are inserted therein. A pressurized actuation fluid is then introduced into cylinders 35 and 36 through line 38 and tee 37, causing opposed outward movement of pistons 39 and 40. Axial movement of piston 39 is transmitted through ring 41, seal 29, test ring 31, seal 27 and ring 26 to segmented bowl 15. As bowl 15 is urged axially outward, shear pins 24, 25 and 26a will shear off and slips 18 will be forced into engagement with pipe 11. This actuated position of slips 18 and bowl segments 16 is illustrated in FIG. 4, which shows the entire coupling in the actuated condition. The interacting wedged condition of bowl 13, slips 18 and segmented bowl 15 will thusly opposed axial forces in tension and compression which may be exerted upon pipe 11 relative to housing 10. A relative compressive force therebetween will tend to wedge wickers 17 of bowl segments 16 into tighter engagement with housing 10 and tend to wedge wickers 23 of slips 18 into tighter engagement with pipe 11. A relative tensile force will tend to cause wickers 23 again to be driven tighter against pipe 11 by bowl 13, thereby driving wickers 17 on bowl segments 16 against housing 10.

Continued actuation force from pistons 39 is opposed by slips 18 and bowl segments 16 causing ring 26 to exert a reaction force upon seals 27 and 29. As the seals compress and deform radially into engagement with pipe 11, test ring 31 will move adjacent inlet line 57. The other one-half of this connector will perform in a manner similar to that above described in response to an axial force from piston 40, with the actuated condition of the coupling assuming the position shown in FIG. 2.

With the coupling actuated, the seals 27, 29, 43 and 46 are hopefully sealingly engaged between housing 10 and pipes 11 and 12 so that a pressurized fluid may be flowed therethrough. These seals may be tested by injecting a pressurized fluid through lines 57 and 58 and into groove 32 in ring 31 and radial passages 33, against the adjacent compressed seals. A drop in the pressure of the test fluid or an observed flow of the test fluid from the ends of housing 10 would indicate an improper seal. In that event an actuation fluid of increased pressure could be introduced through line 38 to reset the seals.

Heretofore the only way such seals could be tested was by pressurizing the inside of pipes 11 and 12 and inspecting for leaks. Usually the pressurizing fluid would then have to be evacuated from the line before the seals could be reset. Such a procedure was time consuming and difficult where the joined pipes were of large volume or access thereto was restricted. Additionally, such a prior art pressurization test could be dangerous if a flamable or explosive pressurization fluid, such as oil or nature gas was used for the test fluid.

The fluid for actuating and seal testing this coupling can be any readily available fluid such as water or hydraulic oil. However, for permanent connection a hardenable liquid such as an epoxy resin is preferred since, upon hardening, it will act as a backup for the seals and pistons.

As described above, the diameter of tee 37 intermediate cylinders 35 and 36 is of a smaller diameter than cylinders 35 and 36. When a hardenable liquid is used for actuation it will completely fill tee 37 and cylinders 35 and 36 between pistons 39 and 40. Thereafter, if one of the seals should deteriorate allowing one of pistons 39 and 40 to move axially, the restriction in tee 37 will prevent this movement from being transmitted through the hardened actuation fluid to the other piston.

Referring now to FIG. 5, this invention is illustrated for use in a pipe connector and includes a housing 60 having a flange 61 thereon arranged for connection to another member by bolts (not shown) through bolt holes 62. A pipe 63 is slidably coaxially positioned within housing 60.

The upper end of housing 60, as viewed in FIG. 5, has a circumferential, annular inwardly facing tapered bowl 64 formed therein. Inwardly axially spaced from bowl 64 is a second annular tapered bowl 65 which faces outwardly toward bowl 64 and which is formed of a plurality of longitudinally aligned circumferentially spaced tapered bowl segments 66.

Between bowls 64 and 65 are provided a plurality of longitudinally aligned circumferentially spaced slip segments 67, the radially outward surfaces of which are matingly tapered to fit bowls 64 and 65. Shear pins 68 and 69 are provided between bowl 64 and slips 67 and between slips 67 and bowl segments 68, respectively, and provide means for retaining slips 67 and segments 66 in their original circumferential position prior to actuation. Wickers 70 are provided on the radially inward surface of slip segments 67 and similar wickers 71 are provided on the radially outward surface of bowl segments 66. A compression ring 72 is slidably positioned adjacent the wider (or lower, as viewed in FIG. 5) end of segments 66 and provides means for evenly distributing an axial force thereto. A shear pin 72a is provided between ring 72 and each of segments 66 to aid in retaining segments 66 is their original position.

To this point in the description of the FIG. 5 embodiment, all of the operating elements within housing 60 are identical in construction and operation to the similar elements described above with reference to FIGS. 1 – 4. Reference should be made to that discussion for a fuller description of these elements.

Referring now to the central portion of FIG. 5, housing 60 has secured therein an annular cylinder block 73 having a plurality of oppositely facing coaxial cylinders 74 and 75 bored therein. A restriction or tee 76 similar to tee 37 described with reference to FIGS. 1 – 4 is bored into block 73 intermediate cylinders 74 and 75 and an actuation fluid inlet line 77 communicates therewith.

Pistons 78 and 79 are slidably positioned in cylinders 74 and 75, respectively, and are arranged for opposed axially outward movement in response to a fluid pressure in tee 76. Piston 78 contacts ring 72 and is arranged to exert an axial force thereon. Piston 79 contacts a similar annular slidable compression ring 80 which in turn is in abutting contact with a first annular, radially deformable seal 81 formed of packer rings 82. A second annular, radially deformable seal 83 formed of packer rings 84 is provided in housing 60 and is axially spaced from seal 81 by annular, slidable pressure test ring 85. A test fluid inlet line 86 is connected to housing 60 adjacent seal 83 and provides means for injecting a test fluid into ring 85, as described below. Seals 81 and 83 and test ring 85 are identical to those elements described above with reference to FIGS. 1 – 4.

In operation housing 60 is slidingly positioned over the end of pipe 63 and an actuation fluid under pressure is introduced through line 77 and tee 76 to cylinders 74 and 75 and against pistons 78 and 79. As piston 78 moves upward, as viewed in FIG. 5, ring 72 will force segments 66 and slips 67 upward against bowl 64. Wickers 70 on slips 67 will then engage and grip pipe 63 and wickers 71 on segments 66 will engage and grip housing 60.

At the same time piston 78 moves upward, piston 79 will move downward compressing and radially deforming seals 81 and 83 and moving ring 85 adjacent inlet line 86. As described above, a test and backup fluid may then be introduced against seals 81 and 83 through line 86 and ring 85. If seals 81 or 83 deteriorate for any reason, allowing movement of piston 79, the restriction in tee 76 will not allow a hardened actuation fluid to move freely from cylinder 75 to cylinder 74 and the engagement of slips 67 and bowl segments 66 will not be impaired.

Further modifications and alternative embodiments of the invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. In a connector for tubular members, the combination comprising:
    a housing arranged for positioning over the end of a tubular member;
    said housing having therein gripping means for engaging the outer surface of said tubular member upon actuation and seal means for forming a pressure tight seal between said housing and said tubular member upon actuation, said gripping seal means being actuatable in response to an axial force applied thereto;
    means carried by said housing for imparting a hydraulically generated axial actuation force to said gripping means and seal means;
    said force imparting means including a plurality of longitudinally aligned circumferentially spaced cylinders provided in said housing, and a pair of pistons slidably positioned in each end of each of said cylinders; and
    the inside diameter of said cylinders intermediate said pistons being less than the outside diameter of said pistons, whereby a solid material disposed within said cylinders intermediate said pistons will be prevented from freely communicating movement of one piston to the other piston in the same cylinder.

2. The invention as claimed in claim 1 including:
    means for injecting a pressurized fluid into said cylinders intermediate said pistons to create said hydraulically generated actuation force.

3. The invention as claimed in claim 2 wherein:
    said pressurized fluid is a hardenable liquid.

4. The invention as claimed in claim 1 wherein said gripping means includes:
    said housing having an annular, circumferential inwardly facing tapered bowl formed therein;
    an outwardly facing tapered annular bowl positioned within said housing and arranged for axially sliding movement toward said inwardly facing bowl and radially outward movement into gripping engagement with the radially inward surface of said housing upon actuation thereof; and,
    an annular slip assembly slidably positioned intermediate said bowls within said housing, the radially outward surface of said assembly being formed to matingly engage said bowls, said assembly being arranged for radially inward movement into engagement with said tubular member in response to axial forces from said bowls.

5. The invention as claimed in claim 4 wherein said seal means includes:
    first and second annular seals carried by said housing and arranged for actuation into sealing engagement between said housing and said tubular member;
    an annular ring carried by said housing and positioned intermediate said seals, said ring being arranged to communicate a pressurized fluid to said seals;
    and, means for transmitting a pressurized fluid to said ring.

6. In a pipeline connector, the combination comprising:
    a housing arranged for slidable positioning over the end of a pipe to which connection is to be made, said housing having an annular, radially inwardly facing tapered bowl formed therein, and said housing having a plurality of cylinders longitudinally aligned and circumferentially spaced therein at a point axially spaced apart from said tapered bowl;
    a pair of hydraulic pistons mounted in each of said cylinders, with one of each pair arranged for axial movement toward said tapered bowl and the other one of said pair away from said bowl in response to application of fluid pressure thereto;
    means in said housing for transmitting a first pressurized fluid to the ends of said pistons for actuation thereof;
    a plurality of pipe gripping slips supported in said housing adjacent said tapered bowl, with said slips having outwardly facing tapered slips cooperative with said bowl for camming said slips radially inwardly upon axial movement toward said bowl in response to actuation of said pistons, and said pipe slips having a gripping surface on the radially inward side thereof for gripping said pipe upon actuation thereof;
    a pair of resilient seals supported in said housing generally axially adjacent the ends of one of each of said pairs of pistons, said seals being arranged for radial deformation into sealing engagement between said pipe and said housing in response to actuation of said pistons;
    an annular ring slidably mounted between said seals, said annular ring having conduit means therein for transmitting a pressurized fluid to the adjacent axial ends of said seals when said seals have been moved to the sealing position;
    means in said housing for transmitting another pressurized fluid to said annular ring after said seals have been actuated to the sealing positions;

and means for retaining said gripping slips in the radially retracted non-actuated position prior to actuation of said pistons.

7. The invention as claimed in claim 6 wherein:
the inside diameter of said cylinders intermediate said pistons being less than the outside diameter of said pistons, whereby a solid material disposed within said cylinders intermediate said pistons will be prevented from freely communicating movement of one piston of said pair to the other piston of said pair.

8. In a pipeline connector, the combination comprising:
a housing arranged for slidable positioning of the end of a pipe to which connection is to be made, said housing having an annular, radially inwardly facing tapered bowl formed therein, and said housing also having a plurality of cylinders longitudinally aligned and circumferentially spaced therein at a point axially spaced apart from said tapered bowl;
a hydraulic piston mounted in each of said cylinders and arranged for axial movement toward said tapered bowl in response to application of fluid pressure thereto;
means in said housing for transmitting a first pressurized fluid to one end of said pistons for urging said pistons axially toward said tapered bowl;
a plurality of pipe gripping slips supported in said housing adjacent said tapered bowl, with said slips having outwardly facing tapered slips cooperative with said bowl for camming said slips radially inwardly upon axial movement toward said bowl in response to actuation of said pistons, and said pipe slips having a gripping surface on the radially inward side thereof for gripping said pipe upon actuation thereof;
a pair of annular resilient seals supported in said housing between said pipe gripping slips and said pistons, said seals being arranged for radial deformation into sealing engagement between said pipe and said housing in response to actuation of said pistons;
an annular ring slidably mounted between said seals, said annular ring having conduit means therein for transmitting a pressurized fluid to the adjacent axial ends of said seals, when said seals have been moved to the sealing position;
means in said housing for transmitting another pressurized fluid to said annular ring after said seals have been actuated to the sealing positions;
and means for retaining said gripping slips in the radially retracted non-actuated position prior to actuation of said pistons.

* * * * *

UNITED STATES PATENT OFFICE
CERTIFICATE OF CORRECTION

Patent No. 3,713,675　　　　　　　　　　Dated January 30, 1973

Inventor(s) William E. White, Jr.

It is certified that error appears in the above-identified patent and that said Letters Patent are hereby corrected as shown below:

Column 4, line 47 "provide" should be --provided--

Column 5, line 8 "opposed" should be --oppose--

Column 5, line 50 "nature" should be --natural--

Column 8, line 47 "slips" should be --surfaces--

Column 10, line 3 "slips" should be --surfaces--

Signed and sealed this 10th day of July 1973.

(SEAL)
Attest:

EDWARD M. FLETCHER, JR.　　　　　　Rene Tegtmeyer
Attesting Officer　　　　　　　　　　Acting Commissioner of Patents